US012705638B2

(12) United States Patent
Besecker et al.

(10) Patent No.: US 12,705,638 B2
(45) Date of Patent: Aug. 11, 2026

(54) GEOGRAPHIC TRACKING AND NON-FUNGIBLE TOKEN TRADING PLATFORM

(71) Applicant: Wazuzu, Inc., Lancaster, PA (US)

(72) Inventors: Joseph Edward Besecker, Lititz, PA (US); Joseph Eric Besecker, Philadelphia, PA (US); Charles Durham, Lititz, PA (US)

(73) Assignee: Wazuzu, Inc., Lancaster, PA (US)

( * ) Notice: Subject to any disclaimer, the term of this patent is extended or adjusted under 35 U.S.C. 154(b) by 0 days.

(21) Appl. No.: 18/069,645

(22) Filed: Dec. 21, 2022

(65) Prior Publication Data

US 2023/0196397 A1 Jun. 22, 2023

Related U.S. Application Data

(60) Provisional application No. 63/265,850, filed on Dec. 22, 2021.

(51) Int. Cl.
*G06Q 30/02* (2023.01)
*G06Q 20/38* (2012.01)
*G06Q 30/0207* (2023.01)

(52) U.S. Cl.
CPC ....... *G06Q 30/0209* (2013.01); *G06Q 20/389* (2013.01)

(58) Field of Classification Search
CPC ... G06Q 30/0209; G06Q 20/389; G06Q 20/36
See application file for complete search history.

(56) References Cited

U.S. PATENT DOCUMENTS

| | | | | |
|---|---|---|---|---|
| 8,616,981 | B1 | 12/2013 | Guinn et al. | |
| 9,669,296 | B1 * | 6/2017 | Hibbert | A63F 13/5378 |
| 10,946,283 | B1 | 3/2021 | Meilich et al. | |
| 11,173,404 | B1 | 11/2021 | Koch | |
| 11,338,204 | B1 * | 5/2022 | Koch | A63F 13/216 |
| 2011/0261071 | A1 * | 10/2011 | Ganetakos | G06Q 10/00 345/619 |

(Continued)

OTHER PUBLICATIONS

"How NFTs Will Impact Ownership of Virtual Items in Videogames" (published Oct. 18, 2021 at https://www.winston.com/en/blogs-and-podcasts/the-playbook/how-nfts-will-impact-ownership-of-virtual-items-in-videogames#:~:text=The%20recent%20proliferation%20of%20NFTs,ownership%20for%20a%20virtual%20item) (Year: 2021).*

(Continued)

*Primary Examiner* — James M Detweiler
(74) *Attorney, Agent, or Firm* — Cozen O'Connor

(57) ABSTRACT

A geographic tracking and non-fungible token trading platform generates a premium asset uniquely identified by a non-fungible token (NFT) and including at least one redeemable item. The platform awards the premium asset to a user of a client device based on gameplay in a game on the platform. The platform determines a value of the premium asset based at least in part on a rank of the premium item that is based on availability and/or obtainability of the premium asset within the platform and at least in part on whether the at least one redeemable item has been redeemed. The platform generates a dashboard displaying the premium asset to the user and interacts with the user to redeem the redeemable item and interacts with the client device to trade the premium asset on an NFT marketplace.

19 Claims, 11 Drawing Sheets

(56) References Cited

U.S. PATENT DOCUMENTS

| | | | | |
|---|---|---|---|---|
| 2015/0375120 | A1* | 12/2015 | Lim | A63F 13/798 463/23 |
| 2019/0108578 | A1* | 4/2019 | Spivack | G09B 5/065 |
| 2019/0220836 | A1 | 7/2019 | Caldwell | |
| 2019/0299105 | A1 | 10/2019 | Knight et al. | |
| 2020/0242105 | A1 | 7/2020 | Rich et al. | |
| 2020/0342539 | A1 | 10/2020 | Doney | |
| 2020/0353362 | A1 | 11/2020 | Sachson et al. | |
| 2021/0201336 | A1* | 7/2021 | Mallett | G06F 3/011 |
| 2021/0201625 | A1 | 7/2021 | Simons | |
| 2022/0383303 | A1* | 12/2022 | Mullen | G06Q 20/389 |
| 2023/0101707 | A1* | 3/2023 | Smith | A63F 13/35 463/42 |
| 2023/0182025 | A1* | 6/2023 | Benedetto | G06Q 30/0209 463/42 |

OTHER PUBLICATIONS

“Rarity _ Path of Exile Wiki” (webpage published online at https://pathofexile.fandom.com/wiki/Rarity on Aug. 8, 2021 and using Wayback Internet Archive on Apr. 6, 2026) (Year: 2021).*

International Search Report and Written Opinion of the International Searching Authority for International Patent Application No. PCT/US2022/053711 mailed Apr. 5, 2023, 9 pages.

Extended European Search Report for European Application No. 22912451.6 mailed on Feb. 9, 2026, 11 pages.

* cited by examiner

122

GEOGRAPHIC TRACKING AND NON-FUNGIBLE TOKEN TRADING PLATFORM

RELATED APPLICATION

This application claims priority to U.S. Patent Application No. 63/265,850, titled "Geographic Tracking and Non-Fungible Token Trading Platform," filed Dec. 22, 2021, and incorporated herein by reference in its entirety.

BACKGROUND

Online gaming platforms use geolocation and geocaching to bring gaming into the real world. However, user rewards based on game play achievements are typically limited to improving features of that game. For example, a reward for completing a particular level or task in the game includes unlocking a new feature of the game.

SUMMARY

One aspect of the present embodiments includes the realization that rewards for online gameplay are often limited to unlocking features of that online game that have little to no relevance (e.g., real-world value) to the real world and/or that expire when a single redeemable item is redeemed. The present embodiments solve this problem by providing a geographic tracking and non-fungible token (NFT) trading platform that rewards gameplay with a premium asset that may include both redeemable items usable in future gameplay and redeemable items that may include real world rewards (e.g., have real-world value). A value of the premium asset is dynamic since it is based on (a) which of the redeemable items have been redeemed, and (b) on a probability of the premium asset receiving additional redeemable items over time and thereby increasing in value. The platform assigns an NFT to each premium asset that allows the premium asset to be securely tracked and traded on an NFT marketplace. Advantageously, this dynamic value and trading ability significantly increases user online engagement and entertainment.

In one embodiment, a method for trading a premium asset identified by an NFT identifier (ID), includes: generating, at a geographic tracking and non-fungible token trading platform, the NFT; generating, at the geographic tracking and non-fungible token trading platform, the premium asset to include at least one redeemable item, the premium asset being uniquely identified by the NFT; awarding the premium asset to a user of a client device playing a game on the geographic tracking and non-fungible token trading platform; and interacting with the client device to trade the premium asset on an NFT marketplace.

In another embodiment, an online gaming and premium asset trading computer platform, includes: at least one processor; one or more memory resources storing machine-readable instructions that, when executed by the at least one processor, cause the online gaming and premium asset trading computer platform to: generate a non-fungible token (NFT); generate a premium asset uniquely identifiable by an NFT ID formed of a contract number of the NFT, the premium asset having a rank based on availability and/or obtainability of the premium asset within the online gaming and premium asset trading computer platform and including at least one redeemable item; interact with a client device of a user playing an online game; and award the premium asset to the user based on gameplay.

DETAILED DESCRIPTION OF THE EMBODIMENTS

Figure 1:
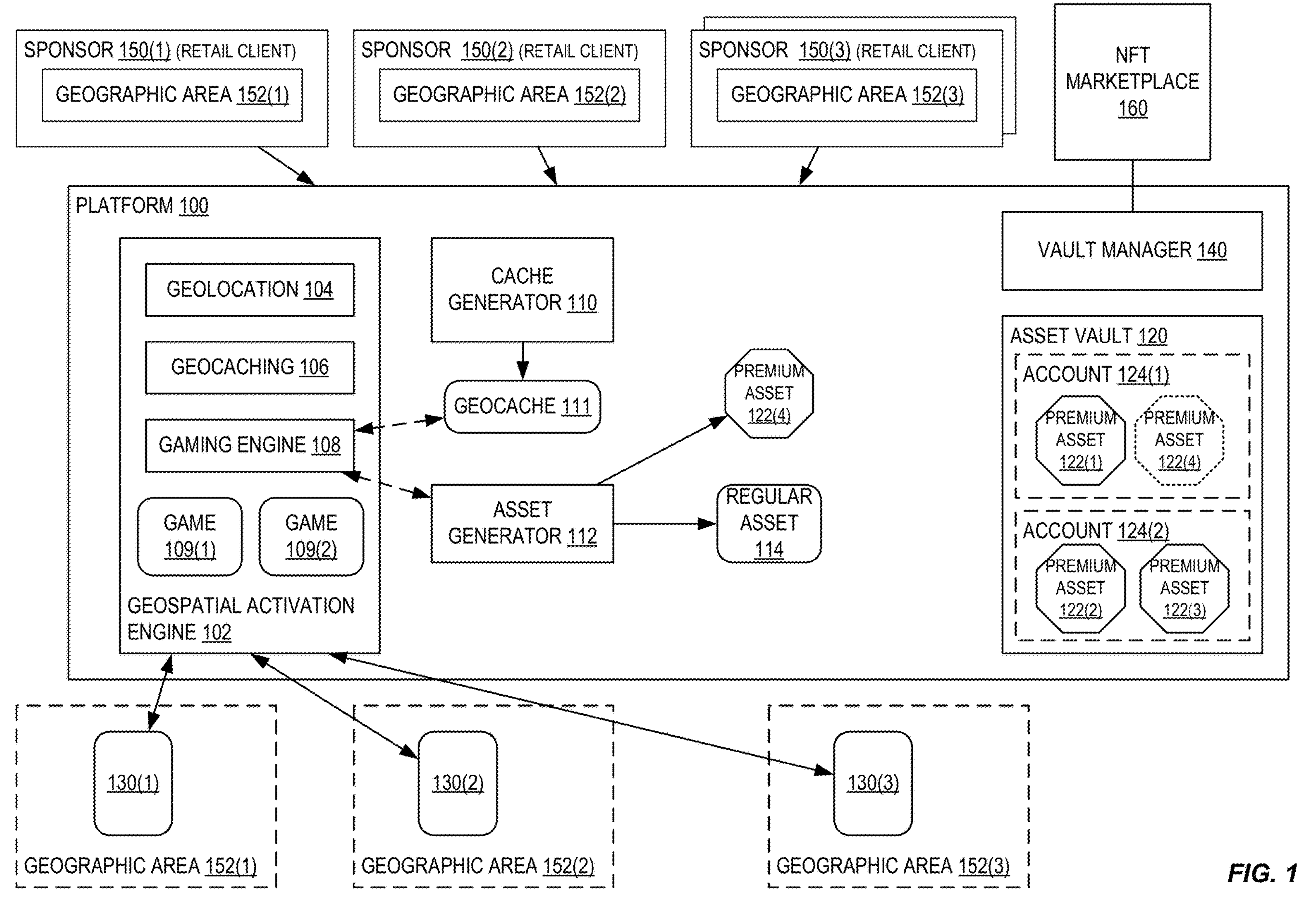
FIG. 1 shows one example geographic tracking and non-fungible token trading platform, in embodiments.

FIG. 1 shows one example geographic tracking and non-fungible token trading platform 100. Platform 100 is, for example, a cloud-based service implemented by at least one computer server having one or more memory resources with non-transitory computer readable media that include machine-readable instructions executable by at least one digital processor that causes the at least one computer server to implement functionality of platform 100 as described herein. Platform 100 may also be referred to as an online gaming and premium asset trading computer platform.

Platform 100 includes a geospatial activation engine 102 that implements geolocation 104, geocaching 106, and includes a gaming engine 108 that interacts with a plurality of client devices 130(1)-(3). Geospatial activation engine 102 may include a cloud based (e.g., online) gaming engine 108 that provides support for multiple online games 109(1)-(2) and interacts with multiple client devices 130 of users playing the game. For example, geospatial activation engine 102 supports role playing augmented reality (AR) type games 109 where gaming engine 108 uses geolocation 104 to determine and/or track a geographical location of each client device 130 and allows interaction with a virtual geocache (e.g., geocache 111, described below) with game 109 when the geographic location of client device 130 is at that real geographical location (or within a geographic area). In the example of FIG. 1, gaming engine 108 supports two games 109(1) and 109(2) that may be independent games or may be related to each other. Geospatial activation engine 102 leverages geolocation 104, based on active location-based services, to track each client device 130 and may create dynamic communications between IT Infrastructure and authenticated location of client devices 130. Games 109 represent video game software applications that may include a uniquely branded front-end experience that is associated with a target demographic. Geospatial activation engine 102 uses geolocation 104 to map/track client device 130 and targets mini-game gameplay experience for each game 109 corresponding to the location of client device 130 retrieved from IT infrastructure.

Platform 100 also includes a cache generator 110 that generates a geocache 111 (e.g., a gaming lure) corresponding to at least one game 109 and at least one real geographical location as a way of enticing players of the online game to visit that location. For example, one or more sponsors 150 may each have an associated geographic area 152, whereby cache generator 110 generates geocache 111 for game 109 in association with (e.g., virtually within) the corresponding geographic area 152. That is, a user travels to a real geographical location such that a reported location of their client device 130 is within the associated geographic area 152, which causes gaming engine 108 to allow geocache 111 to be found at a corresponding virtual location within game 109 by the user.

Platform 100 may also include an asset generator 112 that cooperates with gaming engine 108 to generate regular assets 114 and premium assets 122 that may be earned (e.g., won or captured through gameplay) by the user of client device 130. When earned, premium asset 122 is deposited into account 124 corresponding to the user. Regular assets 114 and premium assets 122 are digital assets that are generated and tracked by platform 100. Regular asset 114 may be a one-time use item, such as one or more of a coupon, and a game specific asset (e.g., a game token, a suit, a skin, a level-up, etc.). In one example, regular asset 114 is a discount coupon provided by sponsor 150(1) in association with geographic area 152(1). In another example, regular asset 114 is a limited time coupon/special/offer targeting sponsor 150(1) in association with geographic area 152(1). In another example, regular asset 114 is a coupon for 10% off a bill at sponsor 150(2) with a minimum purchase. In another example, regular asset 114 is a suit for a player's character in game 109. Premium asset 122 may have one or more redeemable items (see items 208 of FIG. 2) and may be stored and/or traded. Premium assets 122 are described in further detail below with reference to FIG. 2.

In the following examples, references a made to specific geographic areas 152(1)-(3), however, such references could be taken as a reference to any of them. In one example, asset generator 112 generates regular asset 114 to be associated with geographic are 152(2) (or a geographic location), wherein client device 130 may only win regular asset 114 when a current location of client device 130 when actively playing the game is reported as being within geographic area 152(2) (or at or near the geographic location). For example, based on performance of the user of client device 130(1) completing a particular level or challenge within game 109, asset generator 112 generates and sends regular asset 114 to client device 130(1). Regular asset 114 may be used or saved by the user. In one example, regular asset 114 is a limited time coupon/special/offer related to geographic area 152 of sponsor 150 near a location of client device 130 when game 109 was activated. In another example, regular asset 114 is a coupon for 10% off a bill with a minimum purchase at sponsor 150(2) when the location of client device 130 when game 109 was active was within geographic area 152(2).

Platform 100 also includes an asset vault 120, managed by a vault manager 140, that stores premium assets 122 in association with accounts 124 that correspond to users of client devices 130. That is, a user of client device 130 may have an account 124 within asset vault 120. A client device 130 may win at least one premium asset 122 through gameplay of game 109. In the example of FIG. 1, asset vault 120 is shown with two accounts 124(1) and 124(2), where account 124(1) includes premium asset 122(1) and account 124(2) includes premium assets 122(2) and 122(3).

Figure 2:
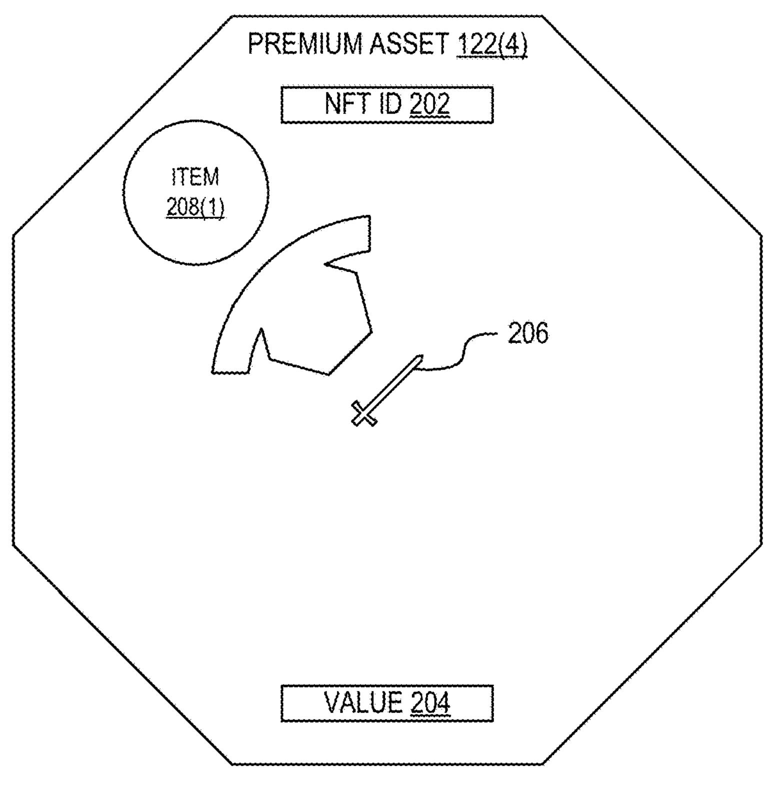
FIG. 2 is a schematic showing the premium asset of FIG. 1 in further example detail, in embodiments.

FIG. 2 is a schematic showing premium asset 122 of FIG. 1 in further example detail. Premium asset 122 includes a non-fungible token (NFT) ID 202 (e.g., an NFT contract number) that uniquely identifies, and defines ownership of, premium asset 122. For example, platform 100 may generates an NFT when generating premium asset 122 such that premium asset 122 is owned and identified by the NFT. Premium asset 122 has an associated value 204 that may be determined by vault manager 140 based upon a current market value and/or trade value of premium asset 122. Premium asset 122 may also include an icon 206 that associates the digital asset with a feature of online game 109 where premium asset 122 was won, and may include zero, one, or more redeemable items 208. In the example of FIG. 2, premium asset 122 has one redeemable item 208(1). Redeemable items 208 add real world value to premium asset 122 and may be separately and uniquely redeemed. Value of premium asset 122 is based, at least in part, on which redeemable items 208 remain within premium asset 122 and may still be redeemed. Redeemable items 208 that are redeemed are effectively removed from premium asset 122 and may not count towards its value, even though they may still be shown. As described below, one or more redeemable items 208 may be added to premium asset 122 over time, and may be linked to other experiences, merchandise, and/or gameplay assets. Availability of any premium asset 122 that has not been earned or won may be indicated by platform 100. For example, gaming engine 108 may generate a token to indicate availability of premium asset 122(4) within a game map of game 109(1) such that players of game 109(1) are aware of, and may compete for, premium asset 122(4). Platform 100 may generate other indications of the availability of premium asset 122(4), such as in lists, consoles, advertisements, and so on. In certain embodiments, selecting these indictors causes vault manager 140 to display additional details of premium asset 122(4).

Redeemable item 208(1) may be any type of item including a one-time token that provides an additional feature or function during the online activity supported by gaming engine 108, tickets for an event, a certificate for a physical item, coupons, and so on. In certain embodiments, coupons may have an expiry date. For example, redeemable item 208(1) may provide the user with an additional strength or function within the online game (e.g., game 109(1)) that was used to win the premium asset 122. In another example, redeemable item 208(1) may be two tickets for a Taylor Swift concert. Icon 206 represents premium asset 122 and may be associated with the user activity within gaming engine 108 that resulted in the user winning the premium asset 122. In the example of FIG. 2, icon 206 is a sword that represents a “power-up” corresponding to redeemable item 208(1).

Premium assets 122 are different from regular assets 114 and have value 204 even when all associated redeemable items 208 have been redeemed, since premium assets 122 may have items added to them in the future. Further, the NFT ID 202 allows premium asset 122 to be traded through platform 100 and an NFT marketplace 160. NFT marketplace 160 may represent any existing NFT trading platform or exchange.

Premium asset 122 may also be associated with one or more geographic areas 152, whereby the user, through interaction with client device 130 and geospatial activation engine 102, may win premium asset 122 only when client device 130 is located within the geographic area 152. For example, client device 130 interacts with gaming engine 108 to play the online game and complete activities and earn, capture, or win regular assets 114 and/or premium assets 122. The more the user plays, the greater the chances the user has of winning regular assets 114 and/or premium assets 122. In certain embodiments, premium asset 122 is assigned to at least one geographic area 152 and has a close time (e.g., a specific time on a specific date) whereby a user with the most points at the close time wins the premium asset 122(4). Asset vault 120 is a dynamic platform between a digital asset creation point (e.g., geospatial activation engine 102) and NFT marketplace 160, and is an extension of specialized digital inventory (e.g., premium assets) within the gaming environment paired with real world value and provides the ability for the premium assets to be traded, sold, fully or partially redeemed, while still retaining value in gameplay and/or the user's digital inventory.

Vault manager 140 is linked with NFT marketplace 160 and uses an NFT contract address (e.g., NFT ID 202, FIG. 2) to identify premium assets 122 within asset vault 120 (e.g., within accounts 124). In certain embodiments, vault manager 140 is NFT marketplace agnostic and has the ability to pull/publish information from any existing or future NFT marketplace 160.

Asset generator 112 generates a new premium asset 122 (e.g., premium asset 122(4)) based on one or more criteria. For example, asset generator 112 may generate new premium asset 122(4) based on one or more of time, sponsorship, engagement by client devices 130, and so on. When initially generated, premium asset 122(4) is unowned, or owned by platform 100, and has at least one redeemable item 208. Asset generator 112 may also generate premium asset 122(4) to be associated with one or more geographic areas 152. Accordingly, only when client device 130 is within the geographic area 152 is client device 130 able to earn, capture, and/or win premium asset 122(4). Similarly, asset generator 112 may generate one or more regular assets 114 that are associated with geographic area 152, and thereby associated with one or more sponsors 150. Accordingly, the associated area and/or location of each regular asset 114 and premium asset 122 requires that client device 130 be within those geographic areas to be able to earn, capture and/or win the corresponding regular asset 114 and/or premium asset 122(4). As described above, platform 100 indicates the availability of regular assets 114 and premium assets 122 to users of client devices 130, thereby attracting the users to those geographic areas. Assets 114 and/or 122 may be created at a predefined ratio and at predefined intervals.

In certain embodiments, asset generator 112 is responsive to factors external to platform 100, such as one or more of sponsor requests, effect of previously generated premium assets 122, a number of premium assets 122 associated with a geographic area 152 that are unowned, a type of premium asset 122, and so on, to generate a new premium asset 122 (e.g., premium asset 122(4)). However, asset generator 112 does not base generation of new premium assets 122 on activity of client devices 130 (e.g., user game play) on platform 100; this avoids the possibility that users may hack the game to generate additional digital assets.

Figure 3:
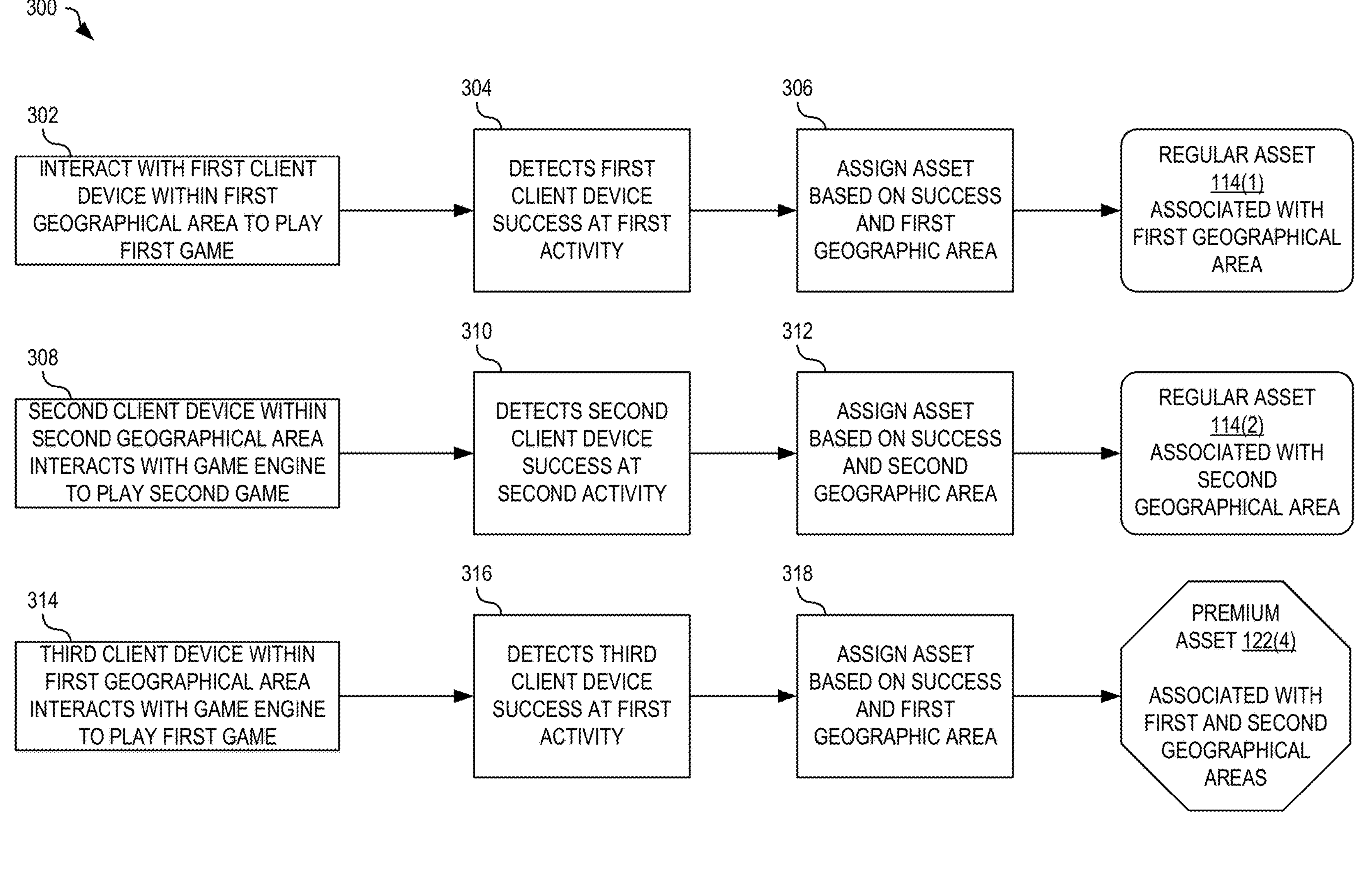
FIG. 3 is a data flow diagram illustrating example game play supported by the platform of FIG. 1, in embodiments.

FIG. 3 is a data flow diagram illustrating one example game play method 300 supported by platform 100 of FIG. 1. In this example, prior to game play, asset generator 112 has generated (a) regular asset 114(1) to be associated with first geographic area 152(1), (b) regular asset 114(2) to be associated with second geographic area 152(2), and (c) premium asset 122(4) to be associated with both the first and second geographic areas 152(1) and 152(2). Accordingly, geospatial activation engine 102 and/or gaming engine 108 displays indications of regular asset 114(1) and premium asset 122(4) in association with geographic area 152(1) and indications of regular asset 114(2) and premium asset 122(4) in association with geographic area 152(2). Accordingly, users of client devices 130 are aware of the opportunity to capture and/or win regular assets 114(1) and 114(2) and premium asset 122(4) and may be enticed to geographic areas 152(1) and 152(2) accordingly.

In block 302, method 300 interacts with a first client device located within a first geographic area to play a first game. In one example of block 302, gaming engine 108 interacts with client device 130(1) to play game 109(1) and determines that client device 130(1) is located within geographic area 152(1). At block 304, method 300 detects the first client device success at a first activity. In one example of block 304, the gaming engine 108 detects the success of a user of client device 130(1) at completing a first activity within game 109(1) while within geographic area 152(1). In block 306, method 300 assigns a first asset to the user of client device 130 based on the user's accomplishment within the first geographic area. In one example of block 306, gaming engine 108 invokes asset generator 112 to assign regular asset 114(1) to the user of client device 130(1), where regular asset 114(1) corresponds to sponsor 150(1) based on geographic area 152(1). In this example, client device 130(1) was not successful at capturing premium asset 122(4).

Blocks 308, 310, 312 correspond to gaming engine 108 interacting with client device 130(2) (e.g., a second client device) to play game 109(2) (e.g., a second game or the same game), detecting success of client device 130(2) at a second activity while within the second geographic area, and assigning regular asset 114(2) to the user of client device 130(2). Blocks 314, 316, 318 correspond to gaming engine 108 interacting with client device 130(3) (e.g., a third client device) to play game 109(1) (e.g., the first game) while within the first geographic area 152(1), detecting success of the user of client device 130(3) at the first activity, and assigning premium asset 122(4) to the user of client device 130(3) based on the user's success. In this case, the user of the third client device 130(3) was able to earn, capture and/or win premium asset 122(4).

Digital Asset Assignment

When asset generator 112 determines that client device 130(1) wins premium asset 122(4), asset generator 112 invokes vault manager 140 to store premium asset 122(4) in account 124(1) corresponding to client device 130(1). Asset generator 112 also interacts with NFT marketplace 160 to generate and register NFT ID 202 of premium asset 122(4) with the corresponding account 124. In these embodiments, vault manager 140 manages creation and storage (e.g., within the corresponding accounts 124 of asset vault 120) of NFT ID 202 such that users of client devices 130 are not required to have crypto wallets. To access premium asset 122(4), the user of client device 130(1) connects (e.g., logs in online) with platform 100 to interact with vault manager 140. Asset vault 120 is secure and changes to accounts 124(1), (2) are only available to the corresponding authorized user. Vault manager 140, based on NFT ID 202 of premium assets 122, allows the user to view, redeem, and trade premium assets 122 stored in their corresponding account 124, as described below. Redeemable items 208 may only be redeemed once by a current owner of premium asset 122(4). Accordingly, as one or more redeemable items 208 are redeemed, the associated value 204 of premium asset 122(4) is reduced. That is, the value of each premium asset 122 is dynamic, based, at least in part, on the redeemable items 208 it contains. Each premium asset 122 is associated with at least one game 109 and may have a value based on its availability. For example, a frequently available premium asset 122 may have a lower value than a rarely available premium asset 122. Accordingly, the value of premium asset 122 may be based on demand within NFT marketplace 160, where collectors may pay a higher price for rare premium asset 122 as compared to a common premium asset 122. For example, as users discover the rarity of a particular premium asset 122, its value may increase. Further, each premium asset 122 may increase in value, since it has a chance of receiving new redeemable items 208 over time, as discussed below.

Digital Asset Detail

As shown in the example of FIG. 2, premium asset 122 is initially created with only redeemable item 208(1), which may be directly related to the activity captured by gaming engine 108. For example, item 208(1) may be a "power-up" for game 109 being played by the user of client device 130, which, when redeemed, upgrades the performance and/or ability of the user's token or character within game 109.

Figure 4:
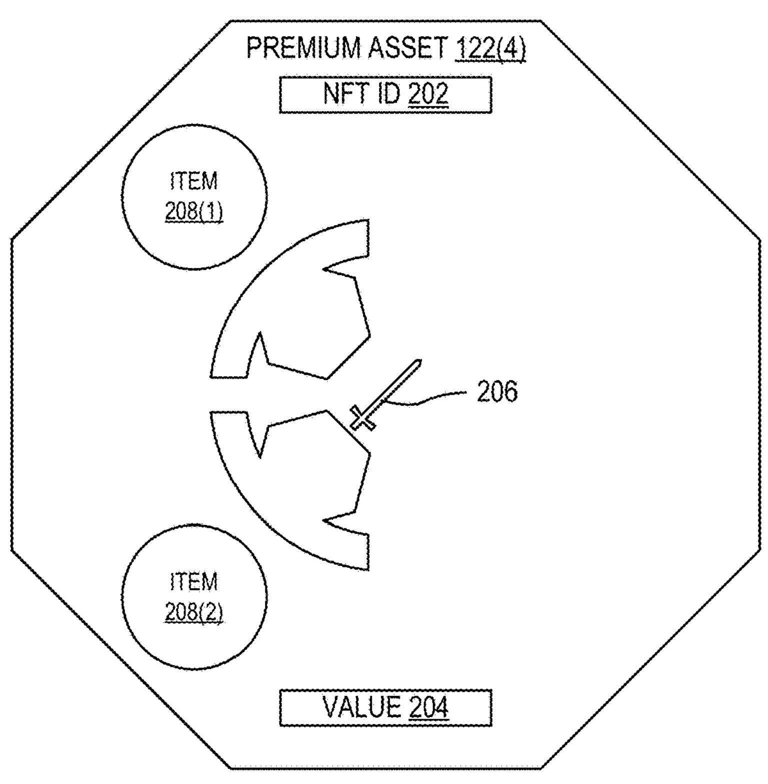
FIG. 4 is a schematic showing the premium asset of FIG. 2 with additional example redeemable items, in embodiments.

FIG. 4 is a schematic showing the premium asset 122 of FIG. 2 with an additional example redeemable item 208(2). Premium assets 122 may have any number of redeemable items 208. Asset generator 112 includes an algorithm that may, at intervals and/or based on certain criteria (e.g., sponsorship), generate new redeemable items 208 that may be awarded to one premium asset 122 that is already assigned (e.g., captured by a user and assigned to one account 124). Premium assets 122 that are not yet earned, captured, and/or won are not eligible to receive new redeemable item 208.

Each premium asset 122 may have a rank based upon its availability, whereby a rare premium asset 122 has a high rank and a common (frequently available) premium asset 122 has a low rank. At intervals and/or based on certain criteria (e.g., sponsorship), asset generator 112 generates at least one new redeemable item 208(2). Platform 100 may advertise the "drop" of the new redeemable item to users of client devices 130 (e.g., on a dashboard and/or panel) that is displayed when client device 130 accesses platform 100. In one example of operation, irrespective of whether item 208(1) was redeemed and irrespective of whether premium asset 122 was traded, when the new redeemable item 208(2) drops, platform 100 and/or asset generator 112 selects one premium asset 122 as a winner of the dropped redeemable item and adds redeemable item 208(2) to the selected one premium asset 122. As noted above, this may increase value 204 of the one premium asset 122. For example, redeemable item 208(2) may be concert tickets for an upcoming concert, whereby value 204 increases by at least the value of the tickets. In another example, redeemable item 208(2) is a power-up for a game hosted by platform 100 that is different from the game in which premium asset 122 was won, whereby the owner of the one asset 122 is enticed to play the different game on platform 100.

Each premium asset 122, based on its rank, has a percentage chance of receiving the dropped redeemable item 208(2). Higher ranked premium assets 122 have a greater chance of receiving the dropped redeemable item 208 as compared to lower ranked premium assets 122. For example, a premium asset 122 of rank 1 (e.g., rare) may have a forty-percent chance of receiving the dropped redeemable item 208, whereas a low ranking (e.g., common) premium asset 122 may have a two percent chance of receiving the dropped redeemable item 208. Accordingly, the higher-ranking premium assets 122 have a higher value (even with no redeemable items) than a lower ranking premium asset, since they are more likely to receive the dropped redeemable item 208.

In certain embodiments, each premium asset 122 may represent a collector "card," similar to a baseball card, where the premium asset 122 is itself a collector item. For lower ranked (more common and more available) premium assets 122, over time platform 100 may issue a subsequent version of the premium asset. These subsequent versions may be similar to earlier versions of the premium asset, having similar associations to game characters etc., but would otherwise appear as a separate premium asset for purposes of ownership and eligibility to receive dropped redeemable items 208.

Figure 5:
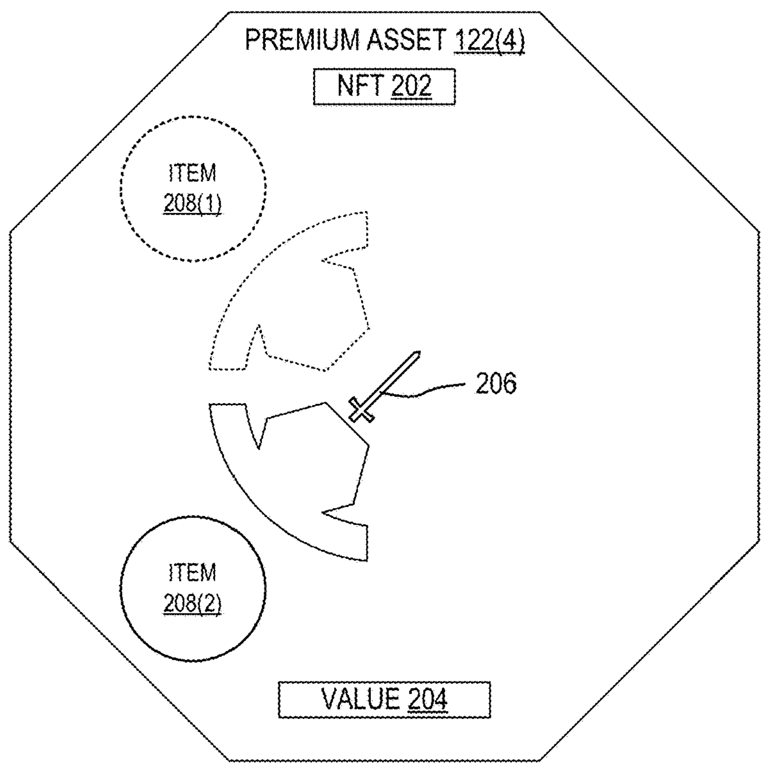
FIG. 5 is a schematic showing the premium asset of FIG. 4 after the user has redeemed one redeemable item, in embodiments.

FIG. 5 is a schematic showing the premium asset 122 of FIG. 4 after the user corresponding to account 124(1) has redeemed redeemable item 208(1) (shown in dashed outline to indicate redeemed), but, since the user is not interested in the different game, the user has not redeemed redeemable item 208(2). Accordingly, the current value 204 of premium asset 122 is based, at least in part, on redeemable item 208(2). However, even when all items are redeemed, the value of any premium asset 122 is not zero, since it retains a possibility of additional redeemable items 208 being added and may have a trade value on NFT marketplace 160.

Figure 6:
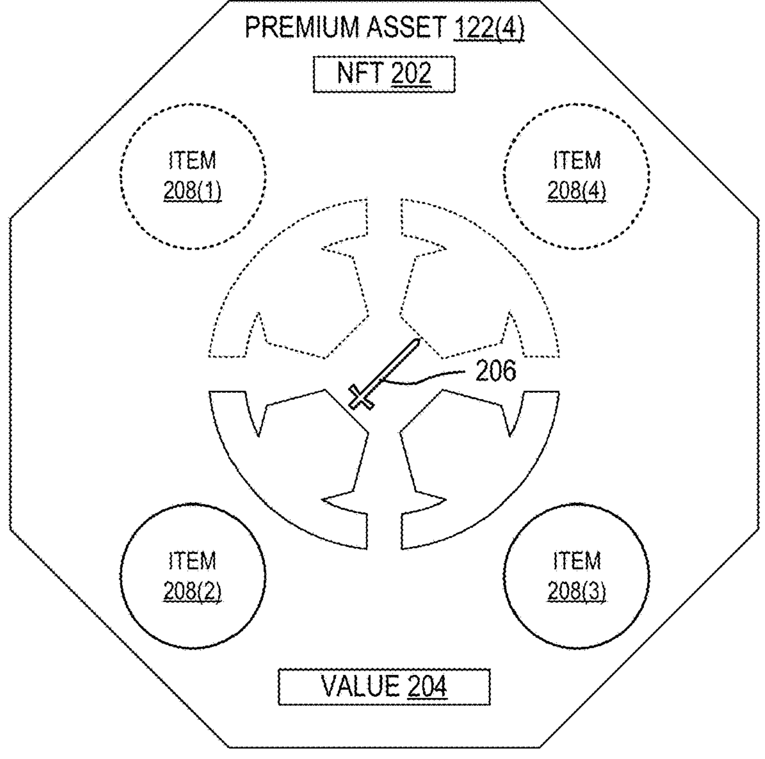
FIG. 6 is a schematic showing the premium asset of FIG. 5 where, over time, additional redeemable assets have been added by the asset generator of FIG. 1, in embodiments.

FIG. 6 is a schematic showing the premium asset 122 of FIG. 5 where, over time, redeemable items 208(3) and 208(4) have been added by asset generator 112. For example, redeemable item 208(3) includes two concert tickets for an upcoming concert by a famous performer and redeemable item 208(4) includes a free burger at a famous burger chain. In this example, the owner of premium asset 122(4) has redeemed redeemable item 208(4) to get the free burger but is not interested in the performer. Accordingly, the current value 204 of premium asset 122(4) is based on redeemable items 208(2) and 208(3), and the possibility of future additional redeemable items 208 being added.

Figure 7:
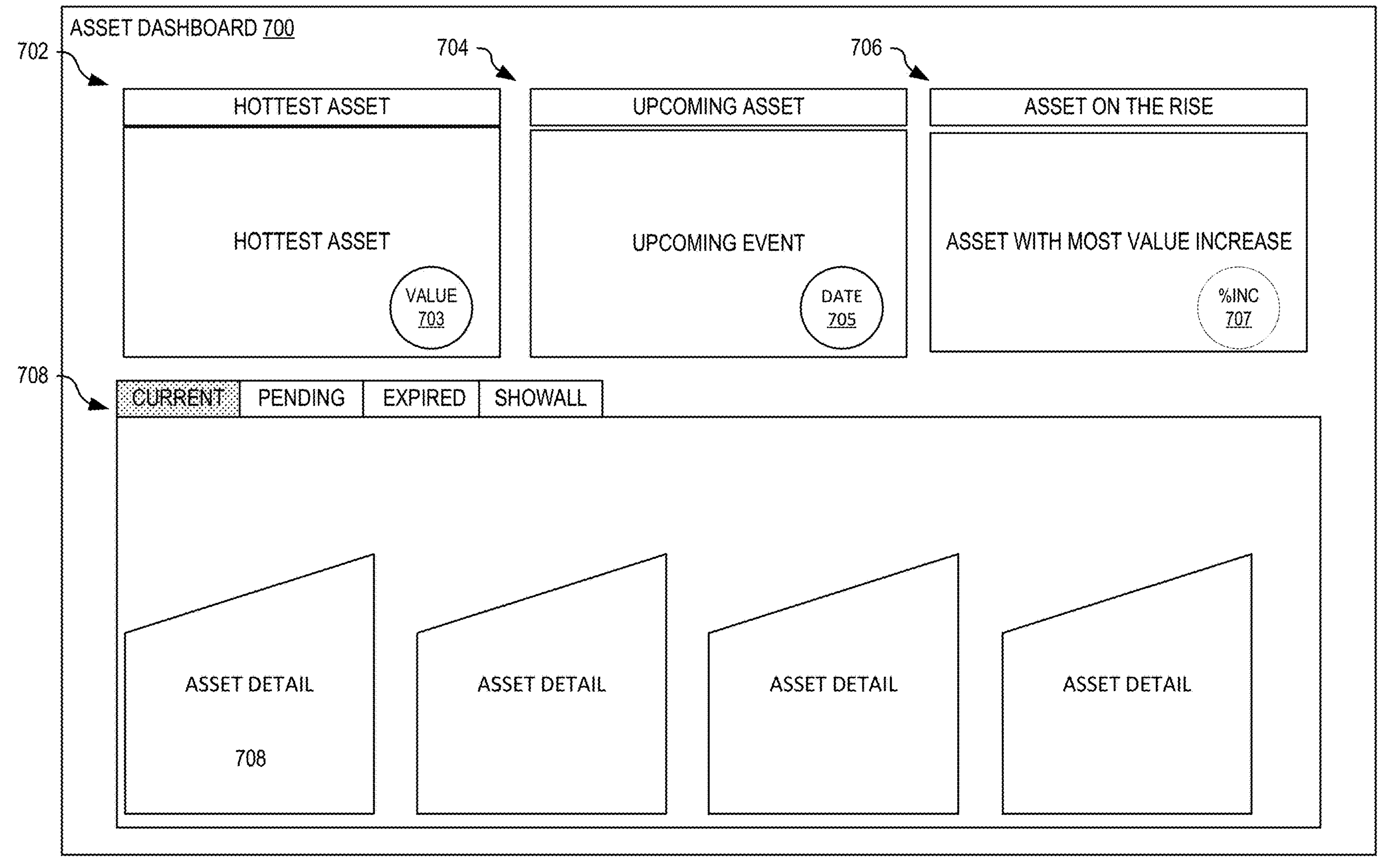
FIG. 7 is a screenshot showing one example asset dashboard generated by the vault manager of FIG. 1 to provide a summary of premium assets within one account, in embodiments.

FIG. 7 is a screenshot showing one example asset dashboard 700 generated by vault manager 140 to provide a summary of premium assets 122 within one account 124. Vault manager 140 provides an online interface to asset vault 120 that allows the user of account 124 to view premium assets 122 within the account 124. For example, based upon redeemable items 208 of each premium asset 122 within the account 124, a first area 702 of asset dashboard 700 may show the most valuable premium asset 122 in account 124, a second area 704 of asset dashboard 700 may show premium asset 122 having a redeemable item 208 (e.g., concert tickets) with a nearest upcoming event date 705, and a third area 706 of asset dashboard 700 may show premium asset 122 of account 124 that has increased the most in value over a defined period (e.g., one week). In certain embodiments, first area 702 may also indicate a current value 703 of the displayed premium asset 122, and third area 706 may indicate a percentage increase 707 in the value of premium asset 122. A fourth area 708 of asset dashboard 700 may have tabs that allow the user to display one of (a) current premium assets 122 within account 124, (b) pending premium assets 122 for account 124, (c) expired premium assets 122 of account 124, and (d) all premium assets 122 of account 124. In certain embodiments, premium assets 122 may be grouped according to rank, where each rank is represented by a particular style, such as a color and/or outline shape.

Figure 8:
FIG. 8 is a screenshot showing example detail of one premium asset selected from asset dashboard of FIG. 7, in embodiments.
Figure 8:
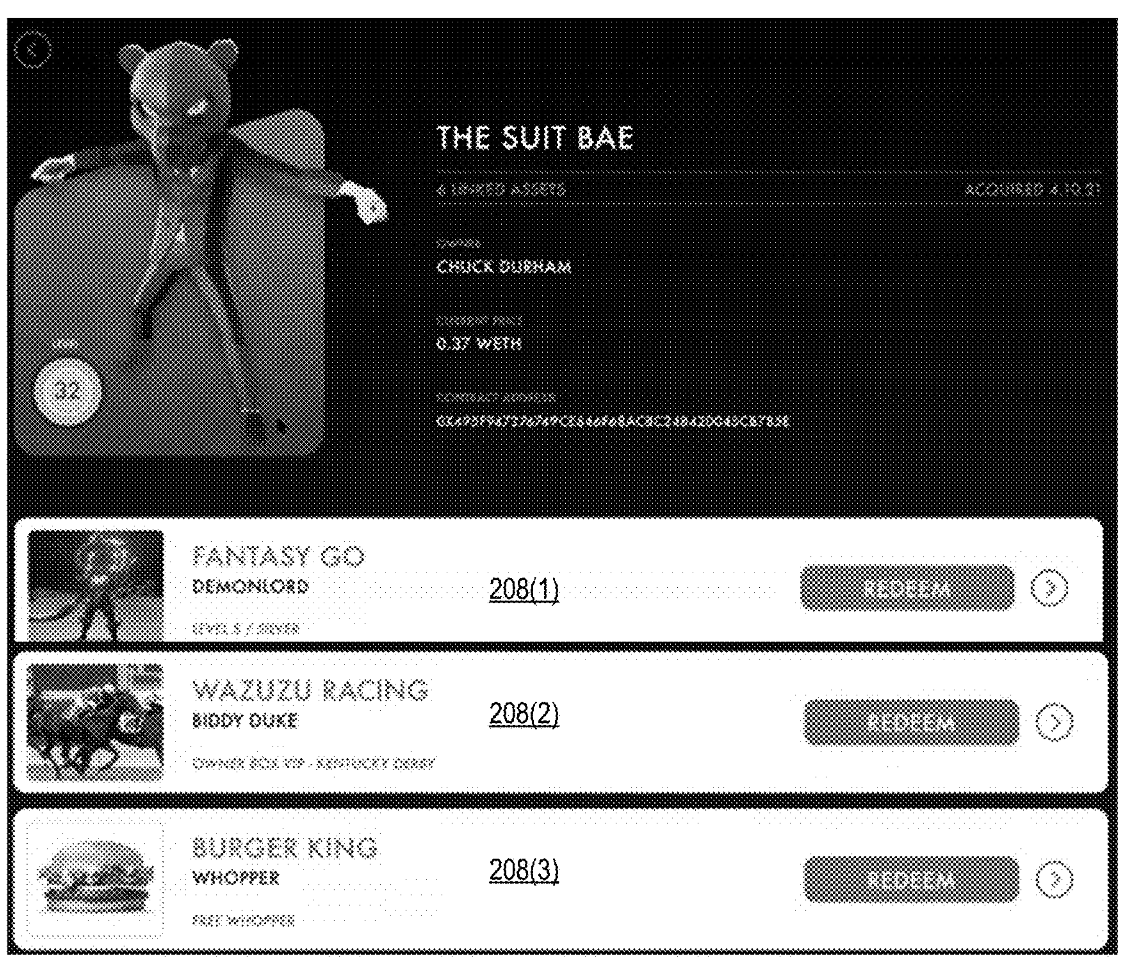

FIG. 8 is a screenshot 800 showing example detail of one premium asset 122 selected from asset dashboard 700. Selecting any one of the displayed premium assets 122 within the asset dashboard 700 causes vault manager 140 to display details of the selected premium asset 122. As shown in screenshot 800, vault manager 140 may show ownership, a current value, and a list of redeemable items 208 associated with premium asset 122.

Figure 9:
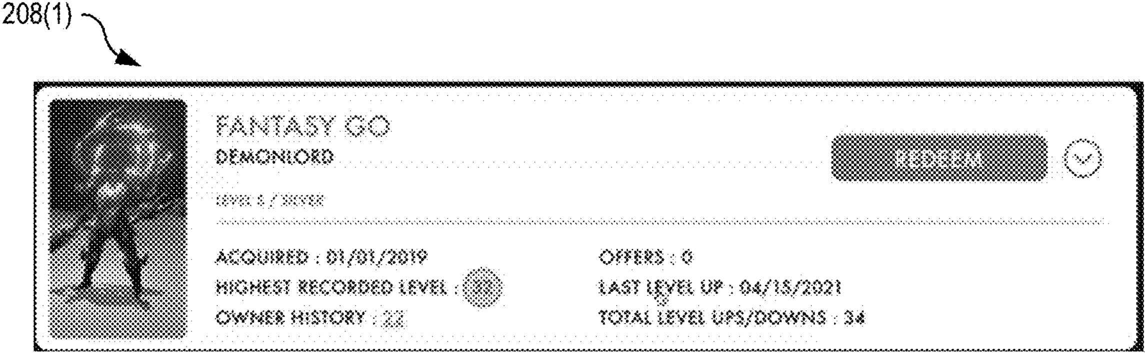
FIG. 9 shows example detail of the redeemable item selected from the screenshot of FIG. 8, in embodiments.

FIG. 9 shows example detail of redeemable item 208(1) selected from screenshot 800 of FIG. 8. In this example, redeemable item 208(1) is a Demonlord character that is usable in an online game 109 called Fantasy Go. For example, redeemable item 208(1) may represent a rare character in a future game. In certain embodiments, premium asset 122 may include one or more redeemable items 208 that are linked to a fantasy sports game, where redeemable items 208 extends the utility of user inventory for use when the user creates a fantasy team for use in the fantasy sports game. For example, the one or more redeemable items 208 may be linked to a fantasy sports game 109 (e.g., game 109(N) of FIG. 11) to be hosted by platform 100 at a future time.

Figure 10:
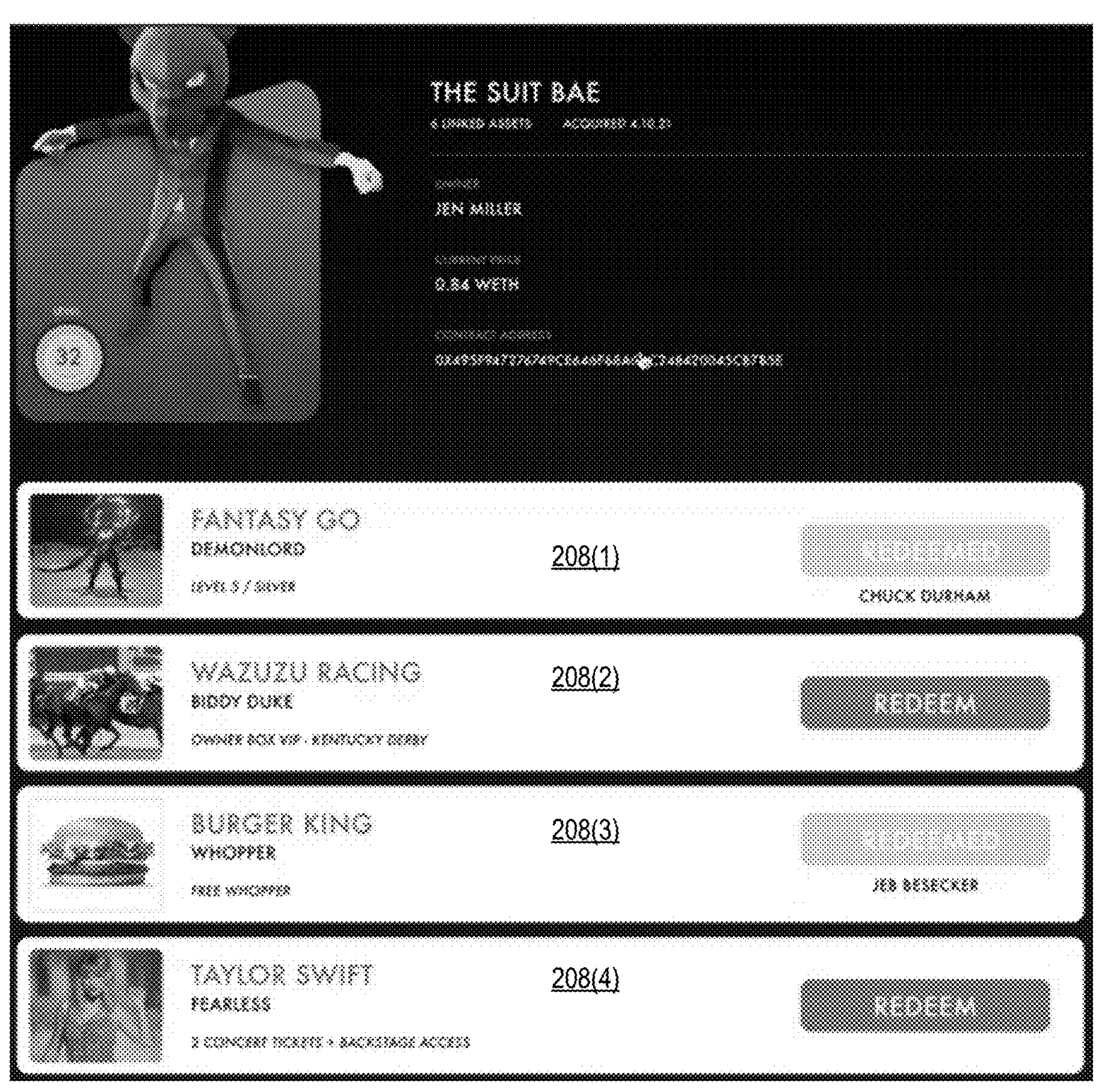
FIG. 10 shows the premium asset of FIG. 8 after trading, redeeming of some redeemable items, and adding of other redeemable items, in an embodiment.

FIG. 10 shows a later representation of premium asset 122 of FIG. 8, where redeemable item 208(1) was redeemed by a first owner of premium asset 122, the premium asset 122 was then traded to a second owner, the second owner redeemed redeemable item 208(3), a new redeemable item 208(4) is added to premium asset 122 (e.g., a year after premium asset 122 was first created), and its estimated value has changed accordingly.

Figure 11:
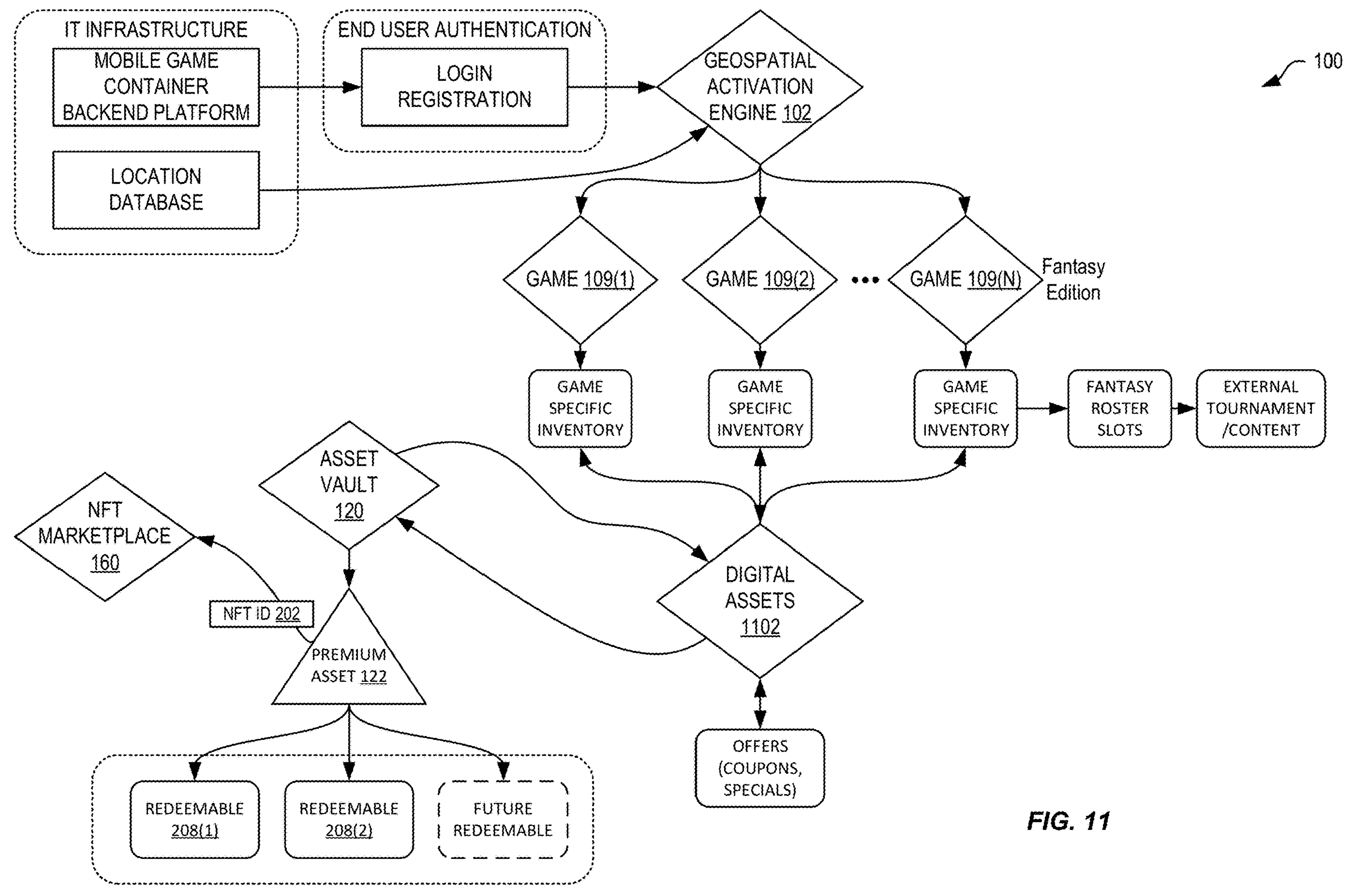
FIG. 11 is a flow diagram illustrating example interaction between components of the platform of FIG. 1, in embodiments.

FIG. 11 is a flow diagram illustrating example interaction between components of platform 100 of FIG. 1. Platform 100 is a dynamic platform positioned between creation of premium assets 122 and an NFT marketplace 160. Platform 100 is an extension of specialized inventory (regular asset 114/premium assets 122) within environments of games 109 that have real world value and may be traded and/or sold. Particularly, the premium assets 122 may be partially redeemed (e.g., redeemable items 208) while the premium asset 122 still retains value in both gameplay and user inventory (e.g., within asset vault 120).

The platform 100 links the asset vault 120 with the NFT marketplace 160 by including the NFT ID 202 (e.g., the NFT contract number) within premium asset 122. NFT ID 202 thereby allows premium asset 122 to be traded in the NFT marketplace 160 and is used to account for the premium assets 122 within the asset vault 120. Asset vault 120 is NFT marketplace agnostic and platform 100 has the ability to pull information/publish from any NFT marketplace that is used now or in the future.

Premium assets 122 attach real-world value (e.g., redeemable items 208) to NFT ID 202 that may be separately and uniquely redeemed. Value may be added to the asset vault 120 (e.g., as a tracker) for premium asset 122 trading and redeemable items 208 redeemed and for remaining current value to the asset. Premium asset 122 may be reinvigorated when asset generator 112 adds new redeemable items 208, thereby adding additional value over time through experiences, merchandise, or gameplay assets.

The geospatial activation engine 102 leverages active location-based tracking services to create dynamic communications between IT Infrastructure and authenticated user (e.g., client device 130) locations. Games 109(1)-(N) represent any type of video game software application that may have a uniquely branded front-end experience associated to target demographic. In the example of FIG. 11, game 109(N) is shown as a fantasy edition. Geospatial activation engine 102 interacts with, and tracks location from IT infrastructure, client device 130 during game 109 gameplay to generate a unique experience.

Premium assets 122 and regular assets 114 may be earned or won from game 109 gameplay and may be related to initial gameplay experience or an improvement to gameplay experience. For example, a game 109 may generate game specific inventory, such as a power-up, new piece of equipment, character, time-limited special, etc., which may be used in that game.

Regular assets 114 may be linked to specific specialized premium assets 122. In one example, regular asset 114 is a physical reward provided to the user based upon determined location. For example, regular asset 114 may be a limited time coupon/special/offer related to a geographic area 152 in which the gameplay experience was activated, such as a coupon for 10% off a bill with minimum purchase for a restaurant (e.g., corresponding to sponsor 150) in which the user is playing game 109.

In specific games 109 (e.g., game 109(N)), premium assets 122 and/or regular assets 114 are linked to a fantasy sports database that extends the utility of user inventory (e.g., redeemable items 208) for use in creating a fantasy team that may be used in tournaments and contests that are dependent on the fantasy sports database. This fantasy team may be used for a short time period (1 gaming week) or for an entire season based on the dynamics of game 109 for example.

Game specific inventory, regular assets 114, and premium assets 122, collectivity referred to as digital assets 1102, may be stored in asset vault 120 in association with an account of the user. Through interaction with asset vault 120, the user (e.g., the owner of premium asset 122) may redeem redeemable items 208 of premium asset 122 and may, using NFT ID 202 associated with premium asset 122, trade premium asset 122 on NFT marketplace 160. Similarly, the user may acquire a new premium asset 122 from the NFT marketplace 160.

Figure 12:
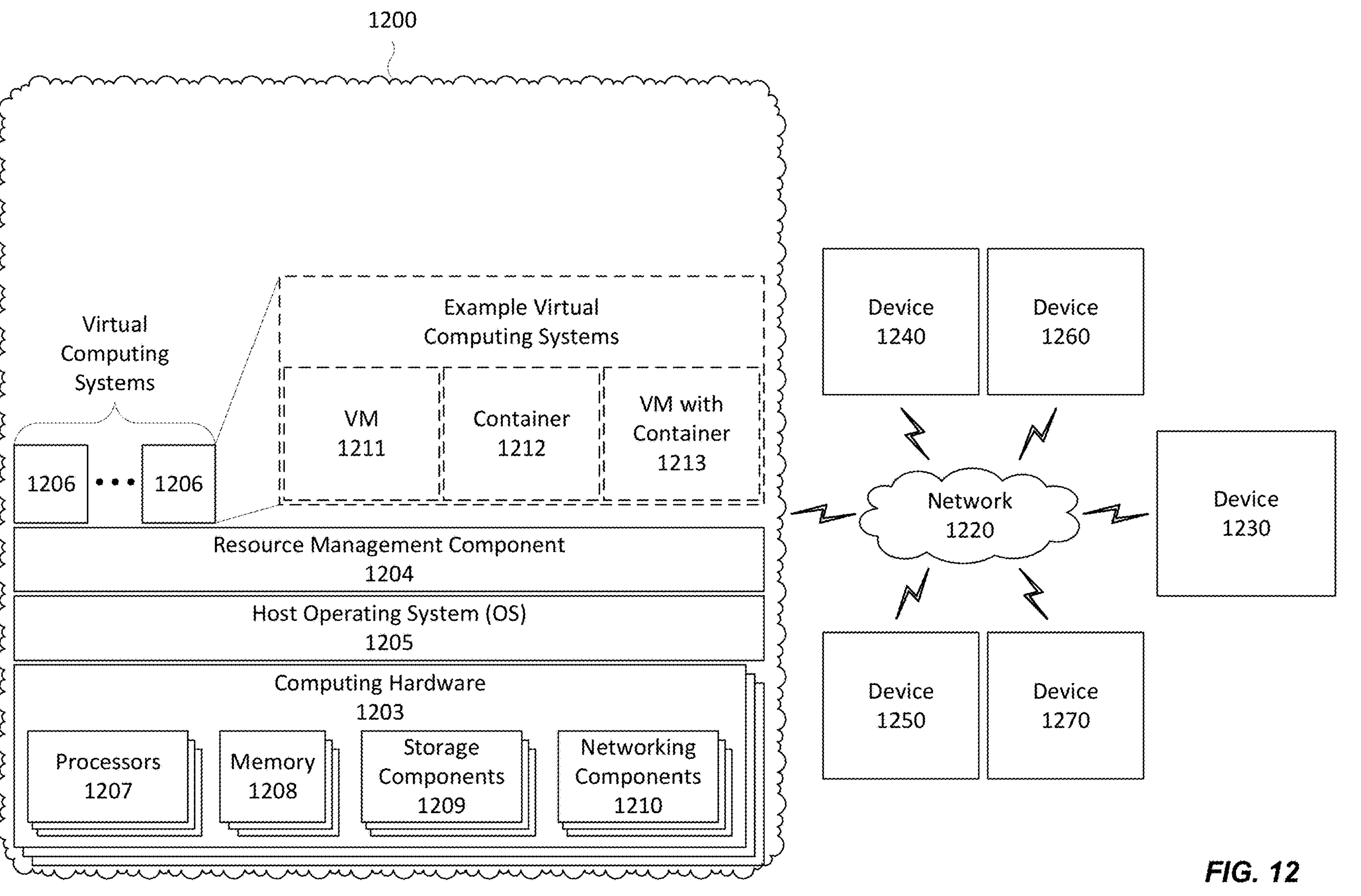
FIG. 12 is a schematic diagram showing one example cloud computing environment in which the platform of FIG. 1 and associated methods described herein may be implemented, in embodiments.

FIG. 12 is a schematic diagram showing one example cloud computing environment 1200 in which platform 100 of FIG. 1 and associated methods described herein may be implemented. As shown in FIG. 12, environment 1200 may include one or more elements 1203-1213, as described in more detail below. As further shown in FIG. 12, environment 1200 may communicate with a network 1220, and one or more client devices 1230, 1240, 1250, 1260, and 1270.

Devices and/or elements of environment 1200 may interconnect via wired connections and/or wireless connections.

The environment 1200 includes computing hardware 1203 (e.g., computer servers), a resource management component 1204, a host operating system (OS) 1205, and/or one or more virtual computing systems 1206. The resource management component 1204 may perform virtualization (e.g., abstraction) of computing hardware 1203 to create the one or more virtual computing systems 1206. Using virtualization, the resource management component 1204 enables a single computing device (e.g., a computer, a server, and/or the like) to operate like multiple computing devices, such as by creating multiple isolated virtual computing systems 1206 from computing hardware 1203 of the single computing device. In this way, computing hardware 1203 can operate more efficiently, with lower power consumption, higher reliability, higher availability, higher utilization, greater flexibility, and lower cost than using separate computing devices.

Computing hardware 1203 includes hardware and corresponding resources from one or more computing devices. For example, computing hardware 1203 may include hardware from a single computing device (e.g., a single server) or from multiple computing devices (e.g., multiple servers), such as multiple computing devices in one or more data centers. As shown, computing hardware 1203 may include one or more processors 1207, one or more memories 1208 storing machine-readable instructions that are executable thy one or more of the processors 1207, one or more storage components 1209, and/or one or more networking components 1210. Examples of a processor, a memory, a storage component, and a networking component (e.g., a communication component) are described elsewhere herein.

The resource management component 1204 includes a virtualization application (e.g., executing on hardware, such as computing hardware 1203) capable of virtualizing computing hardware 1203 to start, stop, and/or manage one or more virtual computing systems 1206. For example, the resource management component 1204 may include a virtual machine monitor, such as when the virtual computing systems 1206 are virtual machines 1211. Additionally, or alternatively, the resource management component 1204 may include a container manager, such as when the virtual computing systems 1206 are containers 1212. In some implementations, the resource management component 1204 executes within and/or in coordination with a host operating system 1205.

A virtual computing system 1206 includes a virtual environment that enables cloud-based execution of operations and/or processes described herein using computing hardware 1203. As shown, a virtual computing system 1206 may include a virtual machine 1211, a container 1212, a hybrid environment 1213 that includes a virtual machine and a container, and/or the like. A virtual computing system 1206 may execute one or more applications using a file system that includes binary files, software libraries, and/or other resources required to execute applications on a guest operating system (e.g., within the virtual computing system 1206) or the host operating system 1205.

Network 1220 includes one or more wired and/or wireless networks. For example, network 1220 may include a cellular network, a public land mobile network (PLMN), a local area network (LAN), a wide area network (WAN), a private network, the Internet, and/or the like, and/or a combination of these or other types of networks. The network 1220 enables communication among the devices of environment 1200.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 1200.

Further Platform Applications

Platform 100 of FIG. 1 has many applications, and the following are provided by way of example and not limitation.

Platform 100 allows local businesses (e.g., sponsors 150) to create or adopt engaging experiences for their customers through use of incentives and rewards, both physical and digital. Geocaching 106 may locate one or more regular assets 114 and/or premium assets 122 at geographic area 152 corresponding to sponsor 150, whereby a user of a client device 130 playing game 109 is drawn to geographic area 152, which coincides with the location of the local business. Advantageously, the local business benefits by providing an engaging experience and luring players of game 109 through incentives and rewards (e.g., coupons). For example, retailers and shopping centers may use platform 100 to implement loyalty programs and provide promotions that are tied to specific locations, thereby encouraging customers to visit and shop at these specific location (e.g., their stores).

Platform 100 may also provide scholastic-themed experiences with points of interest and/or geocaches items located at notable campus locations, and/or may implement a loyalty program with one or more franchises where points-of-interest are physical store locations. In one example, platform 100 is used by a school or university to create educational games and challenges that encourage students to explore the school campus and learn about their surroundings. These experiences may be student athlete focused and/or general event focused. Advantageously, platform 100 allows games and/or assets 114/122 to be event specific (e.g., local concerts and sporting event) and provide sports marketing promotions.

Platform 100, or parts thereof, may be integrated into certain industries such as ride share, public transportation, fitness, healthcare, real estate, social networks, and digital marketplaces. Particularly, through geospatial activation engine 102, platform 100 may track travel of users related to the specific industry and provide engaging experiences and/or incentives and rewards based on the travel. In one example, platform 100 may be used by a travel company to create location-based challenges and rewards for tourists, encouraging them to visit and explore new destinations. Cities and local governments may use platform 100 to create interactive maps and guides for tourists and residents, highlighting points of interest and providing information about local attractions and events.

Platform 100 may integrate with museums, galleries, and cultural institutions to create educational and interactive experiences for visitors. Geospatial activation engine 102 may use geolocation to unlock information and insights about specific exhibits and artifacts as the user moves around the facility. For example, an organization may use platform 100 to implement a virtual exhibition (e.g., as game 109) and showcase their collections in a new and innovative interactive way.

Platform 100 may track consumer carbon credits as a user visits particular locations over other. For example, geospatial activation engine 102 allows platform 100 to rewards individuals taking environmentally friendly actions, such as patronizing environmentally friendly locations and businesses over less environmentally friendly locations.

Platform 100 may use of geolocation-based gamification to teach financial literacy by providing a unique and engaging way to learn about personal finance through interaction with game 109.

Platform 100 may enhance existing games, such as Dungeon and/or Quest. For example, platform 100 may implement Quest as an NFT platform with exclusive redeemable assets (e.g., regular assets 114 and premium assets 122) distributed via time-based, weighted-random system to improve engagement, utility, and value. When game 109 implements a dungeon, platform 100 enhances the dungeon game by providing users with a unique and engaging way to interact with their favorite brands, characters, and digital assets. Platform 100 allows users to adapt previous NFTs and use them within the platform's ecosystem, providing access to a wider range of features and options.

Platform 100 may be licensed for branded and/or focused redeemable engagements and ecosystems, where collectibles are provided for the approved brand's ecosystem.

Content creators may monetize their created content by using vault manager 140 of platform 100 to assign an NFT to the created content and make the created content available for purchase on NFT marketplace 160. Vault manager 140 allows a collector to build and showcase their NFT collections. For example, vault manager 140 allows businesses to create custom NFTs as part of their marketing and branding efforts.

Vault manager 140 may be used to by artists, musicians, and other creators to sell limited edition NFTs of their work and engage with their fans through use of game 109 for example. In one example, an event organizer may use platform 100 to create and distribute NFTs as part of their events, providing attendees with unique and memorable experiences.

Game developers may use platform 100 to integrate NFTs into their games, allowing players to collect, trade, and use the NFTs within their game world.

Platform 100 may also integrate with other platforms, including the Metaverse. The Metaverse is a virtual-reality space in which users interact with a computer-generated environment and other users. In certain embodiments, platform 100 and games 109 may form part of the Metaverse. In other embodiments, platform 100 may interact with other platforms that implement the Metaverse. Accordingly, platform 100 may link with, or form part of, the Metaverse such that assets within asset vault 120 (e.g., NFT based digital assets) are usable within the Metaverse and thereby incorporated into the Metaverse experience. Further, any digital assets gained within the Metaverse may be stored within asset vault 120 and may be usable within other parts of platform 100 (e.g., games 109, vault manager 140, etc.) and may have added utility within platform 100. In certain embodiments, regular assets 114 may be used as currency in the Metaverse and may have no added utility beyond their gold or monetary value (e.g., cryptocurrency). Asset vault 120 and vault manager 140 may allow trading or Metaverse assets on NFT marketplace 160. Further, platform 100 and vault manager 140 may allow Metaverse assets to increase in value over time similar to premium asset 122. For example, platform 100 allows NFTs and premium assets 122 to be stored within asset vault 120 (e.g., a digital space) and used within portions of the Metaverse implemented by platform 100 and used within portions of the Metaverse implemented by external platforms. For example, a sword premium asset/NFT from Tower Tycoons becomes a 3D asset that is usable/interactable within the portion of the Metaverse implemented by platform 100. In another example, premium asset 122 may represent one or more of virtual clothing, accessories, and/or decorative items for avatars, special skills or abilities for characters, provide access to premium areas, and/or provide certain experiences within the metaverse, and/or provide access to other unique content.

Platform 100 may use blockchain technology and tokenization to securely and efficiently record and track information related to for horse racing. For example, platform 100 may advantageously manage one or more of race results, performance data, and ownership records, thereby making faster and more seamless transactions within the horse racing industry, as well as enhanced security and protection against fraud. In one example, race organizers may use platform 100 to manage and track information related to races, such as entries, results, and prize money. In another example, horse owners and trainers may use platform 100 to track the performance and ownership of the horses. In another example, platform 100 may be used by fans and bettors to access real-time information and make informed decisions about races and horses.

Figure 13:
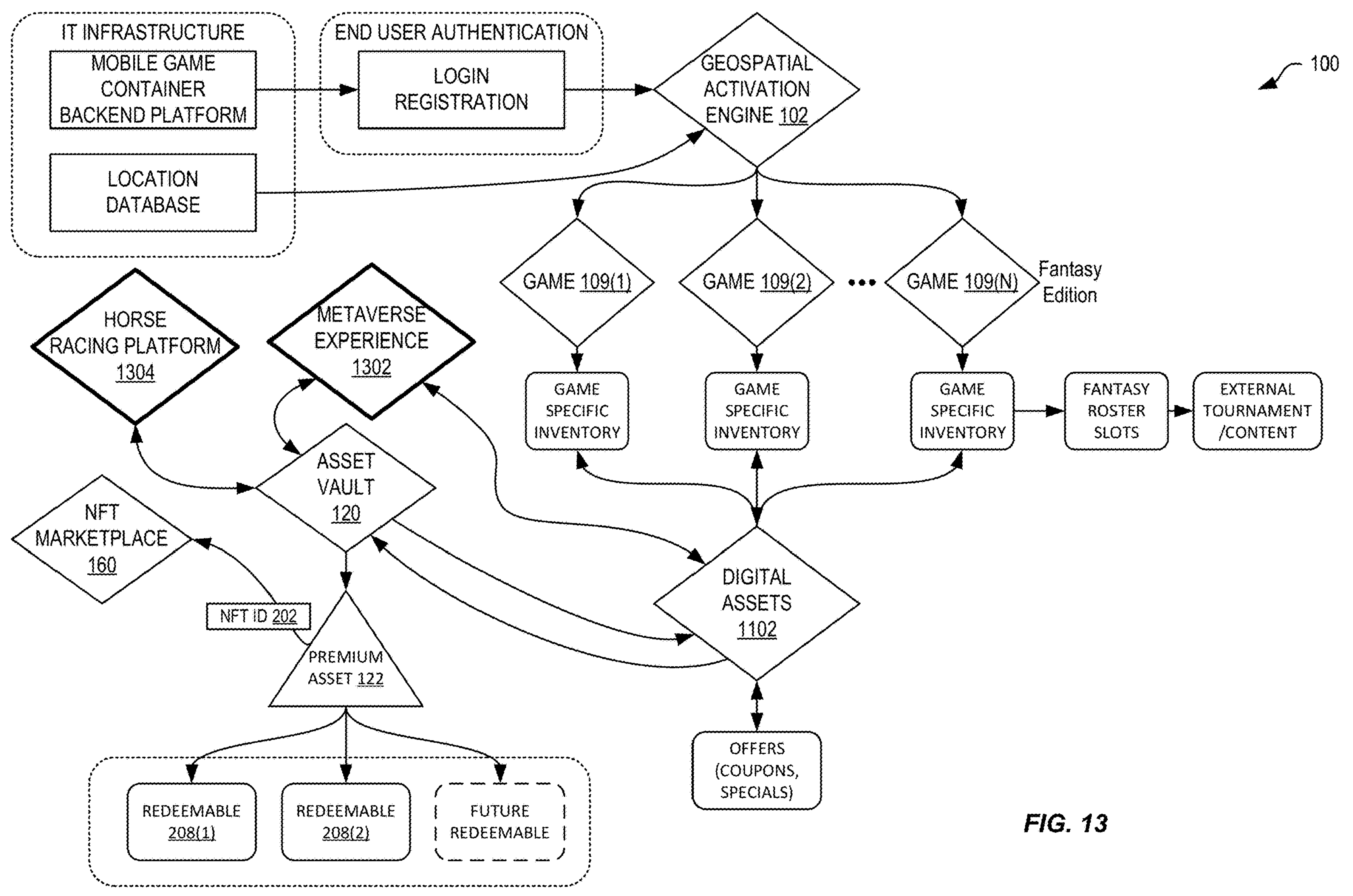
FIG. 13 is a flow diagram illustrating example interaction between the platform of FIG. 1 and (a) a Metaverse experience and/or (b) a horse racing platform, in embodiments.

FIG. 13 is a flow diagram illustrating example interaction between platform 100 of FIG. 1 and (a) a Metaverse experience 1302 and/or (b) a horse racing platform 1304. Platform 100 may connect to one or both of Metaverse experience 1302 and horse racing platform 1304. FIG. 13 is similar to FIG. 11 but further shows Metaverse experience 1302 communicating with asset vault 120 and digital assets 1102 and shows horse racing platform 1304 communicating with asset vault 120.

As noted above, the Metaverse may be implemented on external platforms and/or implemented in part by platform 100. Accordingly, platform 100 may interface with at least one external platform to interact with the Metaverse.

Figure 14:
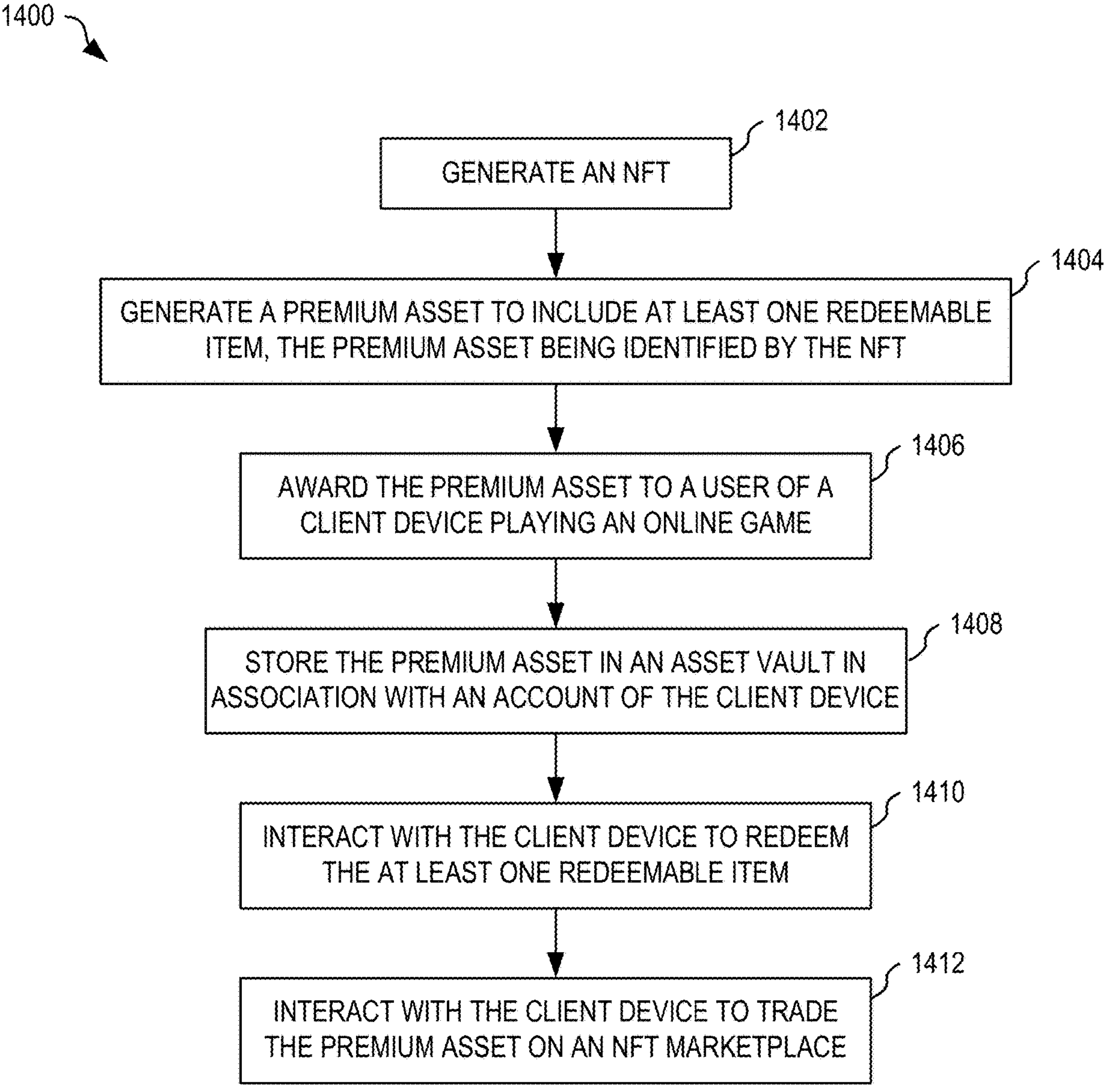
FIG. 14 is a flowchart illustrating one example geographic tracking and non-fungible token trading platform method, in embodiments.

FIG. 14 is a flowchart illustrating one example geographic tracking and non-fungible token trading platform method 1400. Method 1400 is implemented by platform 100 of FIG. 1 for example.

In block 1402, method 1400 generates an NFT. In one example of block 1402, platform 100 generates an NFT and obtains its identifier (e.g., NFT contract number). In block 1404, method 1400 generates a premium asset to include at least one redeemable item, the premium asset being identified by the NFT. In one example of block 1404, asset generator 112 generates premium asset 122 and uses the identifier of the NFT as an identifier of the premium asset. In block 1406, method 1400 awards the premium asset to a user of a client device playing an online game. In one example of block 1406, asset generator 112 awards premium asset 122 to a user of client device 130(1) based on gameplay within game 109(1).

In block 1408, method 1400 stores the premium asset in an asset vault in association with an account of the client device. In one example of block 1408, vault manager 140 stores premium assets 122(4) in asset vault 120 in association with account 124(1) that correspond to the user of client device 130(1). In block 1410, method 1400 interacts with the client device to redeem the at least one redeemable item.

In one example of block 1410, vault manager 140, based on NFT ID 202 of premium assets 122(4), allows the user of client device 130(1) to view and redeem redeemable item 208(1). In block 1412, method 1400 interacts with the client device to trade the premium asset on an NFT marketplace. In one example of block 1412, vault manager 140, based on NFT ID 202 of premium assets 122(4), allows the user of client device 130(1) to trade premium assets 122(4) on NFT marketplace 160.

Blocks of method 1400 may occur in a different order and/or may be omitted without departing from the scope of the embodiments herein.

In one example of operation, a user purchases a premium asset 122 (e.g., digital asset 1102, FIG. 11) on NFT marketplace 160 and signs up for an account 124 in asset vault 120 to view premium asset 122 using vault manager 140. Premium asset 122 may have a redeemable item 208 associated with horse racing (e.g., a redeemable item 208 that is usable on the horse racing portion of platform 100). Over time, another redeemable item 208 corresponding to one of games 109 may be added to premium asset 122 thereby broadening the user's access and use platform 100. In another example, the reverse could also be true, where the user wins premium asset 122 playing game 109, and through asset vault 120 becomes aware of the premium asset's use within metaverse experience 1302, again broadening the user's access and use of platform 100. Thus, premium assets 122 may drive user experiences on platform 100 as well as having one or more redeemable items 208.

Combination of Features

Features described above as well as those claimed below may be combined in various ways without departing from the scope hereof. The following enumerated examples illustrate some possible, non-limiting combinations:

(A1) A method for trading a premium asset identified by a non-fungible token (NFT) includes: generating, by a computer platform for online gaming and premium asset trading, the NFT; generating, by the computer platform, the premium asset with at least one redeemable item, the premium asset being uniquely identified by the NFT and having an initial value based, at least in part, on the at least one redeemable item; awarding the premium asset to a user of a client device interacting with the computer platform to play a game by depositing the premium asset in an asset vault account corresponding to the user, wherein the premium asset is tradable by the user on an NFT marketplace based on the NFT; and increasing, by the computer platform, the value of the premium asset to a second value by adding a new redeemable item to the premium asset.

(A2) In embodiments of (A1), the NFT defines ownership of the premium asset.

(A3) Either of embodiments (A1) or (A2) further includes defining, by the computer platform, a rank of the premium asset based on availability and/or obtainability of the premium asset.

(A4) Any of embodiments (A1)-(A3) further includes determining the value of the premium asset based, at least in part, on the rank of the premium asset and at least in part upon whether the at least one redeemable item has been redeemed.

(A5) Any of embodiments (A1)-A4), the increasing the value of the premium asset further includes randomly selecting the premium asset over other premium assets on the computer platform based on probability defined by the rank.

(A6) In any of embodiments (A1)-(A5), the premium asset being associated with both a virtual location in the game and with a geographic area.

(A71) Any of embodiments (A1)-(A6), the awarding further includes determining a location of the client device is within the geographic area.

(A8) In any of embodiments (A1)-(A7), the geographic area corresponds to a sponsor and the at least one redeemable item is provided by the sponsor.

(A9) Any of embodiments (A1)-(A8), further includes generating a dashboard to display the premium asset and the at least one redeemable item to the user.

(A10) In any of embodiments (A1)-(A9), interacting, via the dashboard, prior to trading the premium asset, with the user to redeem the at least one redeemable item.

(B1) An online gaming and premium asset trading computer platform includes: at least one processor; and one or more memory resources storing machine-readable instructions that, when executed by the at least one processor, cause the online gaming and premium asset trading computer platform to: generate a non-fungible token (NFT); generate a premium asset having a rank based on availability and/or obtainability of the premium asset within the online gaming and premium asset trading computer platform and including at least one redeemable item, the premium asset having an initial value based at least in part of the rank and at least in part, on the at least one redeemable item; interact with a client device of a user playing an online game; and award the premium asset to the user based on gameplay by depositing the premium asset in an asset vault account corresponding to the user, wherein the premium asset is tradable by the user on an NFT marketplace based on the NFT; and increase the value of the premium asset to a second value by adding a new redeemable item to the premium asset at a later time.

(B2) In embodiments of (B1), the one or more memory resources storing further machine-readable instructions that, when executed by the at least one processor, cause the online gaming and premium asset trading computer platform to interact with the client device and the NFT marketplace to trade the premium asset.

(B3) In either of embodiments (B1) or (B2), the one or more memory resources storing further machine-readable instructions that, when executed by the at least one processor, cause the online gaming and premium asset trading computer platform to assign a geographic area to the premium asset; determine a location of the client device; and award the premium asset to the user based on gameplay only when the location of the client device is within the geographic area.

(B4) In any of embodiments (B1)-(B3), the at least one redeemable item being provided by a sponsor associated with the geographic area.

(B5) In any of embodiments (B1)-(B4), the premium asset is also associated with a virtual area of the online game.

(B6) In any of embodiments (B1)-(B5), the one or more memory resources storing further machine-readable instructions that, when executed by the at least one processor, cause the online gaming and premium asset trading computer platform to generate a dashboard to display the premium asset and the at least one redeemable item to the user.

(B7) In any of embodiments (B1)-(B6), the one or more memory resources storing further machine-readable instructions that, when executed by the at least one processor, cause the online gaming and premium asset trading computer platform to interact, via the dashboard, prior to trading the premium asset, with the user to redeem the at least one redeemable item.

(B8) In any of embodiments (B1)-(B7), the one or more memory resources storing further machine-readable instructions that, when executed by the at least one processor, cause the online gaming and premium asset trading computer platform to decrease the value of the premium asset when the at least one redeemable item is redeemed.

(B9) In any of embodiments (B1)-(B8), the one or more memory resources storing further machine-readable instructions that, when executed by the at least one processor, cause the online gaming and premium asset trading computer platform to randomly select the premium asset over other premium assets on the online gaming and premium asset trading computer platform to add the new redeemable item to the premium asset.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for trading a premium asset identified by a non-fungible token (NFT), comprising:

generating, by a computer platform for online gaming and premium asset trading, the NFT, the computer platform associated with a first online game and a second online game different from the first online game;

generating, by the computer platform, a premium asset with at least one redeemable item, the premium asset being capable of storing multiple redeemable items, being uniquely identified by the NFT, and having an initial value based, at least in part, on the at least one redeemable item, at least one of the at least one redeemable items being associated with the first online game;

receiving, from a client device interacting with the computer platform after generation of the premium asset, gameplay activity of a user playing the first online game;

awarding the premium asset to the user based on the gameplay activity by depositing the premium asset in an asset vault account corresponding to the user, wherein the premium asset is tradable by the user on an NFT marketplace based on the NFT;

increasing, by the computer platform and independently of gameplay by the user in the first online game, the value of the premium asset to a second value by adding a new redeemable item to the premium asset, the new redeemable item associated with the second online game;

generating a ranking associated with the premium asset based on availability and/or obtainability of the premium asset relative to availability and/or obtainability of a plurality of other premium assets; and dropping one or more further redeemable items for the user within a virtual gaming environment of one or both of the first online game and the second online game based on percentage chance defined by the generated ranking, wherein the one or more further redeemable items are virtual items configured for gameplay utilization within one or both of the first online game and the second online game.

2. The method of claim 1, wherein the NFT defines ownership of the premium asset.

3. The method of claim 1, further comprising defining, by the computer platform, the ranking based on availability and/or obtainability of the premium asset.

4. The method of claim 3, further comprising determining the value of the premium asset based, at least in part, on the rank of the premium asset and at least in part upon whether the at least one redeemable item has been redeemed.

5. The method of claim 4, the increasing the value of the premium asset further comprising randomly selecting the premium asset over other premium assets on the computer platform based on probability defined by the rank.

6. The method of claim 1, the premium asset being associated with both a virtual location in the first online game and with a geographic area.

7. The method of claim 6, the awarding further comprising determining a location of the client device is within the geographic area.

8. The method of claim 7, wherein the geographic area corresponds to a sponsor and the at least one redeemable item is provided by the sponsor.

9. The method of claim 1, further comprising generating a dashboard to display the premium asset and the at least one redeemable item to the user.

10. The method of claim 9, interacting, via the dashboard, prior to trading the premium asset, with the user to redeem the at least one redeemable item.

11. An online gaming and premium asset trading computer platform, comprising:

at least one processor; and one or more memory resources storing machine-readable instructions that, when executed by the at least one processor, cause the online gaming and premium asset trading computer platform to:

generate a non-fungible token (NFT);

generate a premium asset being uniquely identified by the NFT and including at least one redeemable item, the premium asset having an initial value based at least in part on the at least one redeemable item, wherein the premium asset is capable of storing multiple redeemable items;

receive, from a client device interacting with the computer platform after generation of the premium asset, gameplay activity of a user playing a the first online game associated with the computer platform, the computer platform also associated with a second online game different from the first online game;

award the premium asset to the user based on the gameplay activity by depositing the premium asset in an asset vault account corresponding to the user, wherein the premium asset is tradable by the user on an NFT marketplace based on the NFT;

increase, independently of gameplay by the user in the first online game, the value of the premium asset to a second value by adding a new redeemable item to the premium asset at a later time, the new redeemable item associated with the second online game;

generate a ranking associated with the premium asset based on value availability and/or obtainability of the premium asset relative to availability and/or obtainability of a plurality of other premium assets; and drop one or more further redeemable items for the user within a virtual gaming environment of one or both of the first online game and the second online game based on percentage chance defined by the generated ranking, wherein the one or more further redeemable items are virtual items configured for gameplay utilization within one or both of the first online game and the second online game.

12. The online gaming and premium asset trading computer platform of The online gaming and premium asset trading computer platform of the one or more memory resources storing further machine-readable instructions that, when executed by the at least one processor, cause the online gaming and premium asset trading computer platform to interact with the client device and the NFT marketplace to trade the premium asset.

13. The online gaming and premium asset trading computer platform of The online gaming and premium asset trading computer platform of the one or more memory resources storing further machine-readable instructions that, when executed by the at least one processor, cause the online gaming and premium asset trading computer platform to:

assign a geographic area to the premium asset;

determine a location of the client device; and award the premium asset to the user based on gameplay only when the location of the client device is within the geographic area.

14. The online gaming and premium asset trading computer platform of claim 13, the at least one redeemable item being provided by a sponsor associated with the geographic area.

15. The online gaming and premium asset trading computer platform of claim 13, wherein the premium asset is also associated with a virtual area of the first online game or second online game.

16. The online gaming and premium asset trading computer platform of claim 11, the one or more memory resources storing further machine-readable instructions that, when executed by the at least one processor, cause the online gaming and premium asset trading computer platform to generate a dashboard to display the premium asset and the at least one redeemable item to the user.

17. The online gaming and premium asset trading computer platform of claim 16, the one or more memory resources storing further machine-readable instructions that, when executed by the at least one processor, cause the online gaming and premium asset trading computer platform to interact, via the dashboard, prior to trading the premium asset, with the user to redeem the at least one redeemable item.

18. The online gaming and premium asset trading computer platform of claim 11, the one or more memory resources storing further machine-readable instructions that, when executed by the at least one processor, cause the online gaming and premium asset trading computer platform to decrease the value of the premium asset when the at least one redeemable item is redeemed.

19. The online gaming and premium asset trading computer platform of claim 11, the one or more memory resources storing further machine-readable instructions that, when executed by the at least one processor, cause the online gaming and premium asset trading computer platform to randomly select the premium asset over other premium assets on the online gaming and premium asset trading computer platform to add the new redeemable item to the premium asset.

* * * * *